US009735821B2

(12) United States Patent
Vecera et al.

(10) Patent No.: US 9,735,821 B2
(45) Date of Patent: Aug. 15, 2017

(54) SUBSCRIBER IDENTITY MODULE (SIM) SELECTION IN MULTI-SIM COMMUNICATION DEVICES

(71) Applicant: Red Hat, Inc., Raleigh, NC (US)

(72) Inventors: Martin Vecera, Brno (CZ); Jiri Pechanec, Mokra-Horakov (CZ)

(73) Assignee: Red Hat, Inc., Raleigh, NC (US)

( * ) Notice: Subject to any disclaimer, the term of this patent is extended or adjusted under 35 U.S.C. 154(b) by 0 days.

(21) Appl. No.: 14/553,175

(22) Filed: Nov. 25, 2014

(65) Prior Publication Data
US 2016/0149605 A1 May 26, 2016

(51) Int. Cl.
H04M 1/00 (2006.01)
H04B 1/3816 (2015.01)
H04W 4/12 (2009.01)
H04M 15/00 (2006.01)

(52) U.S. Cl.
CPC .......... H04B 1/3816 (2013.01); H04M 15/61 (2013.01); H04W 4/12 (2013.01)

(58) Field of Classification Search
CPC .................................................... H04B 1/3816
See application file for complete search history.

(56) References Cited

U.S. PATENT DOCUMENTS

| 7,912,504 | B2 | 3/2011 | Bjorkner |
| 7,929,955 | B1 | 4/2011 | Bonner |
| 2008/0020773 | A1 | 1/2008 | Black et al. |
| 2009/0239584 | A1* | 9/2009 | Jheng ................. H04W 8/26 455/558 |
| 2010/0240414 | A1* | 9/2010 | Lotenberg .......... H04W 8/183 455/558 |
| 2011/0081951 | A1* | 4/2011 | Hwang ................ H04W 8/183 455/558 |

(Continued)

FOREIGN PATENT DOCUMENTS

| EP | 1051052 | 11/2000 |
| WO | 2012164589 | 12/2012 |

OTHER PUBLICATIONS

Ghadialy, Zahid, "Multi-SIM: The Jargon," The 3G4G Blog, Jan. 30, 2014, 12 pages, http://blog.3g4g.co.uk/2014/01/multi-sim-jargon.html.

(Continued)

Primary Examiner — Idowu O Osifade
(74) Attorney, Agent, or Firm — Lowenstein Sandler LLP

(57) ABSTRACT

A method relates to identifying, by a processing device, a plurality of subscriber identity modules (SIMs) coupled to the processing device, each of the plurality of SIMs storing data enabling a set of communication services provided by a respective one of a plurality of communication service providers, determining a request parameter comprising at least one of a time, a location of the processing device, or a destination to provide a first communication service, determining a plurality of cost rates to provide the first communication service by the respective one of the plurality of communication service providers in view of a cost rate table and the request parameter, selecting a first SIM from the plurality of SIMs in view of the plurality of cost rates, and displaying, on a screen of the processing device, a first icon indicating the selected first SIM to provide the first communication service.

20 Claims, 5 Drawing Sheets

(56) References Cited

U.S. PATENT DOCUMENTS

2012/0157094 A1 6/2012 Cheng et al.
2014/0194157 A1 7/2014 Ezekiel et al.
2015/0092611 A1* 4/2015 Ponukumati ............ H04W 4/16
370/259

OTHER PUBLICATIONS

Yam, Marcus, "Roamer: Use Your Phone Abroad Without Crazy Roaming Bills," Tom's Hardware, Feb. 27, 2014, 7 pages, http://www.tomshardware.com/news/roamer-app-phone-roaming-data,26176.html.
Tobia, Marc Weber, "Using Call Forwarding When You Travel: What You Need to Know," Forbes, 6 pages, Aug. 26, 2014, http://www.forbes.com/sites/marcwebertobias/2014/08/26/usingAug-call-forwarding-when-you-travel-what-you-need-to-know/.

* cited by examiner

| SIMs | Time | Origin | Target | Call Rate | Data Rate | SMS Rate |
|---|---|---|---|---|---|---|
| A | Peak | Czech | Germany | €0.11/min | €1.5/MB | €0.07/SMS |
| A | Off Peak | Czech | Germany | €0.04/min | €0.5/MB | €0.01/SMS |
| B | Peak | Czech | Germany | €0.13/min | €1.3/MB | €0.05/SMS |
| B | Off Peak | Czech | Germany | €0.02/min | €0.7/MB | €0.00/SMS |
| A | Peak | Austria | France | €0.15/min | €1.2/MB | €0.05/SMS |
| A | Off Peak | Austria | France | €0.5/min | €0.2/MB | €0.00/SMS |
| B | Peak | Austria | France | €0.15/min | €1.3/MB | €0.05/SMS |
| B | Off Peak | Austria | France | €0.2/min | €0.4/MB | €0.01/SMS |

SUBSCRIBER IDENTITY MODULE (SIM) SELECTION IN MULTI-SIM COMMUNICATION DEVICES

TECHNICAL FIELD

This disclosure relates to communication devices and, in particular, to selecting a subscriber identity module (SIM) card for a communication service in a multi-SIM communication device.

BACKGROUND

A mobile communication device (such as a mobile phone) may include multiple subscriber identity module ("SIM") cards installed in SIM receptors of the mobile communication device. A SIM card may include an integrated circuit that stores certain information used to identify and authenticate subscribers using the mobile communication device to communication service providers (also referred to as network operators) operating communication networks. Compared to a single-SIM mobile communication device, the multi-SIM mobile communication device allows a mobile communication device user to avoid physically swapping SIM cards. For example, a user of the mobile communication device may acquire a first SIM card from a first communication service provider and a second SIM card from a second communication service provider and install both cards on the multi-SIM mobile communication device. When the mobile communication device roams from a first country covered by the first communication service provider to a second country covered by the second communication service provider, the user may use icons on a user interface of the multi-SIM mobile communication device to manually deselect the first SIM card identifying the first communication service provider and manually select the second SIM card identifying the second communication service provider. In this way, the user does not need to physically swap the first and the second SIM cards each time the user enters a service area covered by a different service provider.

BRIEF DESCRIPTION OF THE DRAWINGS

The present disclosure is illustrated by way of example, and not by way of limitation, in the figures of the accompanying drawings.

DETAILED DESCRIPTION

Figure 1:
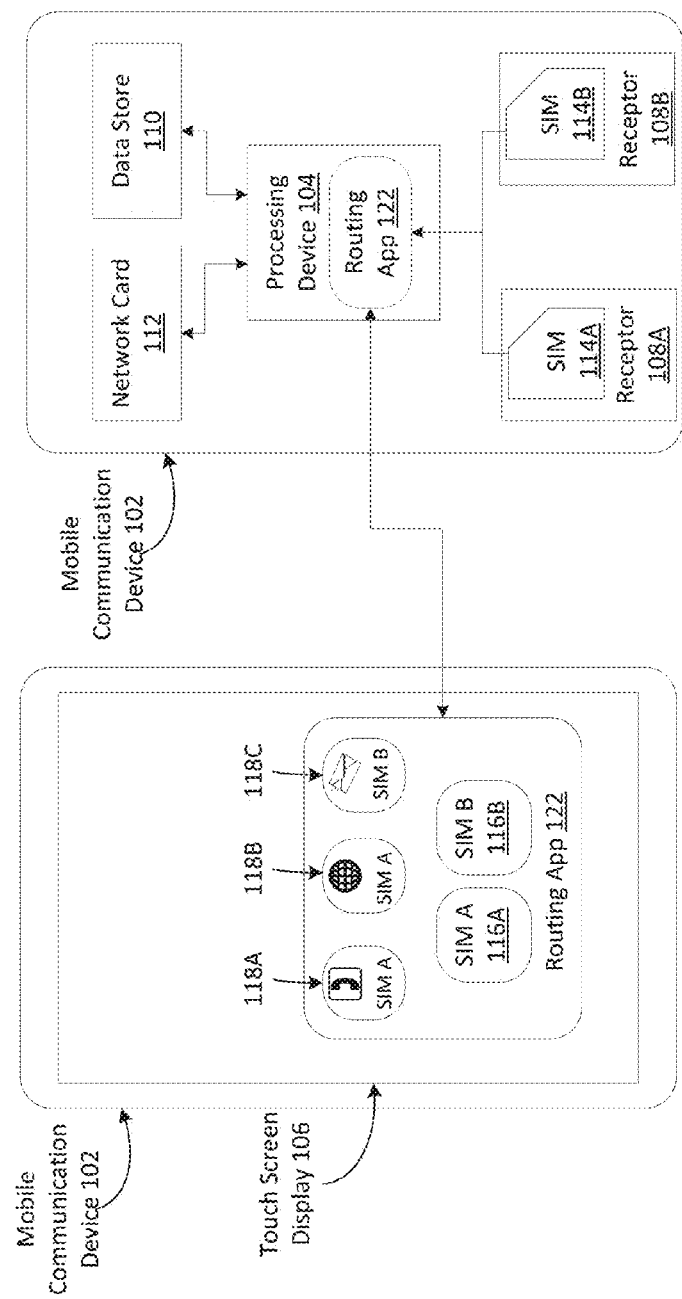
FIGS. 1A-1C illustrate mobile communication devices according to some implementations of the present disclosure.

Certain locations may have communication service coverage provided by multiple communication service providers. For example, if the user of a multi-SIM mobile phone having a first SIM card and a second SIM card wants to make a call from a location covered by both the first communication service provider (associated with the first SIM card) and by the second communication service provider (associated with the second SIM card), the user may need to make an express selection of which SIM cards to use via the user interface. The need for the user to select a SIM card in a location covered by the networks of multiple network operators may be inconvenient to the user of a multi-SIM mobile communication device.

One or more implementations of the present disclosure provide systems and methods to select a SIM card out of multiple SIM cards installed on a mobile communication device in accordance with certain factors. In one implementation, a processing device (such as a processor) of the mobile communication device may execute a selector module that may determine costs or cost rates associated with available communication service providers to provide a given service (e.g., call, data, and SMS services) and select one of the available communication service providers in view of the costs (e.g., selecting the lowest cost communication service provider) on behalf of the user. The selection of a SIM may occur prior to a user initiating a request for a communication service or in response to the request for the communication service. In this way, a SIM card may be selected by the selector module in a manner which is transparent to the user.

Implementations of the present disclosure relate to a method including identifying, by a processing device, a plurality of subscriber identity modules (SIMs) coupled to the processing device, each of the plurality of SIMs storing data enabling a set of communication services provided by a respective one of a plurality of communication service providers, determining a request parameter comprising at least one of a time, a location of the processing device, or a destination to provide a first communication service, determining a plurality of cost rates to provide the first communication service by the respective one of the plurality of communication service providers in view of a cost rate table and the request parameter, selecting a first SIM from the plurality of SIMs in view of the plurality of cost rates, and displaying, on a screen of the processing device, a first icon indicating the selected first SIM to provide the first communication service.

Implementations of the present disclosure relate to a system including a memory to store a cost table and a processing device, coupled to the memory, to identify a plurality of subscriber identity modules (SIMs) coupled to the processing device, each of the plurality of SIMs storing data enabling a set of communication services provided by a respective one of a plurality of communication service providers, determine a request parameter comprising at least one of a time, a location of the processing device, or a destination to provide a first communication service, determine a plurality of cost rates to provide the first communication service by the respective one of the plurality of communication service providers in view of a cost rate table and the request parameter, select a first SIM from the plurality of SIMs in view of the plurality of cost rates, and display, on a screen of the processing device, a first icon indicating the selected first SIM to provide the first communication service.

FIGS. 1A-1B illustrate a mobile communication device 102 according to one or more implementations of the present disclosure. FIG. 1A illustrates a view including a user interface displayed on a touch screen display 106 of the communication device 102 according to an implementation of the present disclosure. FIG. 1B illustrates components of the communication device 102 according to an implementation of the present disclosure. The mobile communication device 102 may be a mobile phone or any type of mobile computing device that is capable of providing one or more communication services of one or more communication service providers on one of more networks. The communication services may include, but not limited to, a voice service, a data service, and a short message service ("SMS"). The one or more networks may be any type of mobile (or wireless) network including, but not limited to, a Global System for Mobile ("GSM") network, a Code Division Multiple Access ("CDMA") network, a Time Division Multiple Access ("TDMA") network, a Long Term Evolution ("LTE") network, and a WiMAX network. The mobile communication device 102 may be connected to the one or more networks via radio frequency ("RF") signals broadcasted from an antenna (not shown) of the mobile communication device 102 to a base station of the one or more networks.

Referring to FIGS. 1A-1B, the mobile communication device 102 may include a processing device (such as a processor) 104, a display (such as a touch screen display) 106, a data store (such as a memory device) 110, a network card 112, and one or more SIM card receptors 108A-108B. The processing device 104 may execute software applications including system applications and user applications. The system applications may include an operating system that provides an interface to the user applications to access different hardware resources (such as the touch screen display 106, the data store 110, the network card 112, SIM receptors 108A-108B). The user applications (also referred to as "Apps") are programs that may execute different tasks on the mobile computing device 102. The data store 110 may be coupled to the processing device 104 to provide storage for the code and data to run the system applications and user applications.

In one implementation, the mobile communication device 102 may execute one or more applications that may display results on the touch screen display 106, and further receive input from a user. For example, the processing device 104 may execute an application to provide the display of one or more icons (such as buttons) on the touch screen display 106 for the user to select. Each of the icons may correspond to a particular task or functionality. In response to receiving a selection of an icon by the user, the processing device 104 may execute the application to perform the task or functionality represented by the selected icon.

In one implementation, the mobile communication device 102 may execute one or more applications to provide one or more communication services offered by one or more communication service providers to the user. The processing device 104 may execute the one or more applications to establish a communication link from the network card 112 to a network. For example, the processing device 104 may execute a call application to present the user with a numerical keyboard on the touch screen display 106 for the user to enter a phone number. In response to receiving a phone number entered by the user on the touch screen display 106, the call application may instruct the processing device 104 to establish a communication link via the network card 112 to a network of a communication service provider. The communication service provider may establish the call to another communication device (such as another phone) that the user dialed. Similarly, a SMS application may send a text message to another communication device, and a web application (such as a web browser) may establish a data communication for the user.

In one implementation, the mobile communication device 102 may include one or more SIM receptors 108A-108B coupled to the processing device 104 via a bus system (not shown) to receive a respective SIM 114A-114B. Each of the SIM 114A-114B may store information that may identify the mobile communication device 102 and the user as a subscriber to a communication service to a communication service provider. The SIM may be any type of SIMs such as full-sized SIM, mini-SIM, micro-SIM, nano-SIM, or embedded-SIM. When SIMs 114A-114B are coupled into the SIM receptors 108A-108B, the processing device 104 may retrieve the information stored on the SIMs 114A-114B to identify the mobile communication device 102 to the networks of communication service providers.

A user may acquire the SIMs 114A-114B via retail channels or directly from a communication service provider. Each of the SIMs 114A-114B may store certain information to identify the mobile communication device 102 to the issuing communication service provider. In one implementation, the SIMs 114A-114B may store an international mobile subscriber identity (IMSI) which is a unique identifier associated with a corresponding communication service provider. Based on the IMSI stored in a SMI card, the communication service provider may uniquely link the communication service provider to a subscriber using the communication service. Each of the SIMs 114A-114B may also store other data representing information such as an authentication key (Ki) that may be used to secure the communication link from the mobile communication device 102 to the network, and store certain contact information and SMS messages.

The mobile communication device 102 may include two or more SIMs 114A-114B installed thereon (or plugged into the SIM receptors 108A-108B). Each of the SIMs 114A-114B may identify the mobile communication device 102 as a subscriber to a respective communication service provider (e.g., communication service providers A and B). Further, certain locations may be covered by both communication service providers A and B. Thus, the user of the mobile communication device 102 may have an option to use communication service provider A or communication service provider B at these locations. In some implementations, the processing device 104 may execute an application to display, on the touch screen display 106, a first icon 116A linked to SIM 114A and a second icon 116B linked to SIM 114B prior to establishing the communication link to a network. In response to receiving a selection (e.g., by a user) of the first icon 116A on the touch screen display 106, the processing device 104 retrieves the IMSI data from the SIM 114A and establishes the communication link with the communication service provider A. Similarly, in response to receiving the selection of the second icon 116B on the touch screen display 106, the processing device 104 retrieves the IMSI data from the SIM 114B and establishes the communication link with the communication service provider B. The manual selection of a SIM on the touch screen display 106 is inconvenient to the user of the mobile communication device 102.

One or more implementations of the present disclosure relate to automatically selecting a SIM card according to certain criteria so that the user of the mobile communication device 102 does not need to manually select a SIM (or a communication service provider) to enable a communication service. One implementation of the present disclosure includes a routing application 122 executing on the processing device 104. Prior to establishing a network connection with a service provider, the routing application 122 may calculate expected costs (or the rate at which the cost accumulates) associated with providing each communication service using each of the SIMs 114A-114B that are available on the mobile communication device 102 and determine the most suitable SIM for each of the communication service. For example, at a certain location and time, the mobile communication device 102 may have the option to use both SIM 114A and SIM 114B to provide any one of the voice for phone calls, data communication for web, or SMS message service at different costs. The routing application 122 may calculate the costs associated with using each of the SIMs 114A, 114B to provide these communication services and determine the most suitable SIM (e.g., based on the cost factor) to provide these communication services. In one implementation, the most suitable SIM may be the least expensive SIM to provide a communication service. In another implementation, the most suitable SIM may be selected according to the expected cost and at least one factor other than the expected cost. For example, a quality of service (QoS) factor (such as voice quality or data packet drop rate) may be considered along with the cost factor in determining which SIM card is the most suitable card.

In addition to the cost factor, other factors may determine which SIM cards to use as the most suitable card. For example, for the convenience of accounting and compliance with a corporate policy, a first SIM card may be designated for personal use, and a second SIM card is designated for business use so that the bills for personal use and business use may be generated separately. In this scenario, the SIM card is selected according to the nature of the communication service rather than according to the cost factor. In one implementation, the mobile communication device may contain a policy (set up by the user) including criteria (such as calls to certain numbers, services at certain locations and times) to determine the nature of the communication service and route to the designated personal SIM card or the designated business SIM card.

In one implementation, for each of the communication services, the routing application 122 may display an icon representing the SIM that provides the communication service. For example, as shown in FIG. 1A, if the routing application 122 determines that the SIM 114A is the most suitable SIM card (e.g., the least expensive card) to provide the voice call and web service, and the SIM 114B is the most suitable SIM card (e.g., the least expensive card) to provide the SMS service, the routing application 122 may display an icon 118A to illustrate that SIM 114A is the most suitable card for a voice call, an icon 118B to illustrate that the SIM 114A is the most suitable card for web service, and an icon 118C to illustrate that the SIM 114B is the most suitable card for providing a SMS service.

In one implementation, a user initiates a request for a communication service using the mobile communication device 102. In response to receiving the request for the communication service, the processing device 104 routes the request for the communication service to a communication service provider based on the already selected SIM for that particular communication service. For example, if the user wants to make a call or browse the Internet, the processing device 104 may execute the call application or an Internet browser to route the request to the network of the communication service provider A associated with SIM 114A. However, if the user wants to send a SMS message, the processing device 104 may execute a SMS application to route the request to the network of the communication service provider B associated with SIM 114B.

In one implementation, in addition to displaying icons 118A-118C to show the selected SIMs for each of the service, the routing application 122 may also display a first button 116A corresponding to SIM 114A and a second button 116B corresponding to SIM 114B. A selection of the first button 116A or the second button 116B may overrule the SIMs selected by the routing application 122 as displayed in icons 118A-118C. For example, if the user wants to use SIM 114B to make a call rather than SIM 114A as selected by the routing application 122, the user may push the button 116B to manually select SIM 114B prior to making the call. Similarly, a selection of the button 116A may indicate the manual selection of SIM 114A for a communication service.

FIG. 1A illustrates an exemplary graphical user interface for the routing application 122 according to one implementation of the present disclosure. However, the graphical user interface for the routing application 122 may be implemented in any suitable manner. FIG. 1C illustrates another graphical user interface for the routing application 122 according to one implementation of the present disclosure. As shown in FIG. 1C, the routing application may display a toggle button 120A showing the most suitable SIM for call service, a toggle button 120B showing the most suitable SIM for data service, and a toggle button 120C showing the most suitable SIM for SMS service. For the example as shown in FIG. 1C, SIM 114A is identified as the most suitable SIM for the call service and the data service while SIM 114B is the most suitable SIM for the SMS service. In the event that the user wants to override the most suitable SIM selected by the routing application 122 for a particular communication service, the user may push the toggle button 120A displaying the most suitable SIM for that service. The push of the toggle button 120A may switch the selected SIM to another SIM. For example, instead of using SIM 114B as displayed on the toggle button 120C for SMS service, the user may push the toggle button 120C and switch the SIM for the SMS service from SIM 114B to SIM 114A. In response to the switch, the routing application 122 may display SIM 114A on the toggle button 120C.

In one implementation, the mobile communication device 102 may include multiple SIMs and consecutive selections of a toggle button may cycle through the multiple SIMs of the mobile communication device 102 until a desired SIM is selected.

In one implementation, a communication service provider may provide a communication service at different cost rates that vary according to certain factors. The factors may include time to provide the service, the location of the mobile communication device, the termination point of the communication service, and the type of the communication service. In one implementation, cost rates for communication service providers stored in SIMs 114A-114B may be compiled into a cost table that may be stored in the data store 110.

Figure 2:
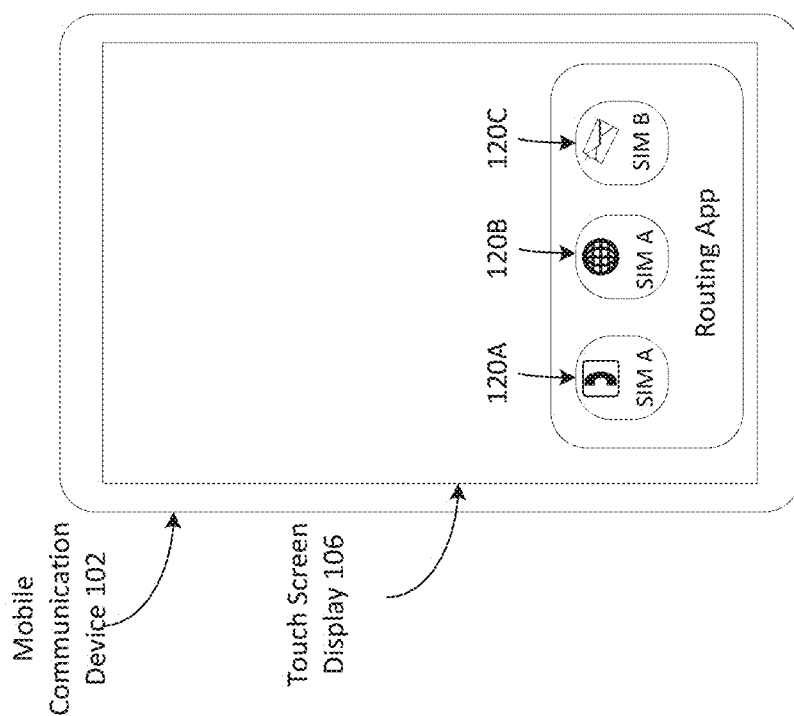
FIG. 2 illustrates a cost table to provide communication services according to an implementation of the present disclosure.

FIG. 2 illustrates an exemplary cost table 200 according to an implementation of the present disclosure. The cost table 200 may include rows indicating factors associated with a cost rate for providing a communication service using a SIM. As shown in FIG. 2, the cost table 200 may include rows for factors impacting the cost rates, such as, time to provide the communication service, the origination, the destination, the cost rate for call, the cost rate for data service, and the SMS rate. Each row may be associated with the cost rate of a particular SIM. For example, as shown in FIG. 2, rows 202, 204, 210, 212 may include the cost rates for SIM 114A to provide call, data, and SMS services at different times from different originating countries to destination countries, and rows 206, 208, 214, 216 may include the cost rates for SIM 114B to provide call data, and SMS services at corresponding time from corresponding originating countries to destination countries.

In one implementation, the routing application 122 uses the cost table 200 to determine the most suitable SIMs to provide communication services at a particular time and location. In one implementation, the most suitable SIM may be the least expensive SIM to provide the communication services. For example, according to the cost table 200, it is cheaper to use SIM 114A to provide call service during peak hours originating from the Czech Republic to the destination of Germany, but cheaper to use SIM 114B to provide data and SMS services. Therefore, the routing application 122 may select SIM 114A for the call service and SIM 114B for data and SMS services during peak hours at the Czech Republic.

The cost rates for providing communication services may vary at different time of the day. Because of this, the selected and displayed most suitable SIM may also change. For example, as shown in table 200, it may be cheaper to provide call service using SIM 114B during off-peak hours at the Czech Republic. Similarly, the cost rates for providing communication services may change at different locations. Because of this, the selected most suitable SIM may also change. For example, as shown in table 200, it may be cheaper to provide data service using SIM 114A during peak hours in Austria.

In one implementation, in response to the change of the selected most suitable SIM, the routing application 122 may also update the display correspondingly. Thus, the display of the selected SIMs may be dynamically changed over time and location.

In one implementation, the routing application 122 may obtain the time information from an internal clock on the mobile communication device 102. Alternatively, the routing application may obtain the time information from the network. In one implementation, the routing application 122 may obtain the location information from a global positioning system (GPS) (not shown) equipped on the mobile communication device 102. In one implementation, the GPS system may inform the routing application 122 of the location (e.g., country, city, state etc.) that the mobile communication device is situated in.

In one implementation, the pricing information in the cost table 200 may be input by the user of the mobile communication device according to a contract between the user and the communication service providers. In another implementation, the cost table 200 may be downloaded to the mobile communication device 102 from a price information repository.

In one implementation, the routing application 122 may learn the preference of a user of the mobile communication device 102 based on a history of SIM selection by the user. For example, the history may show that the user historically overrides a first SIM selected by the routing application 122 to select a second SIM for voice calls from a specific location at a specific time. In this example, the routing application 122 may provide the second SIM to the user in advance in response to detecting the specific location and time. The preference factors that the routing application 122 may learn may include a type of services, time, origination, and destination. The routing application 122 may learn the user preference according to these factors.

Figure 3:
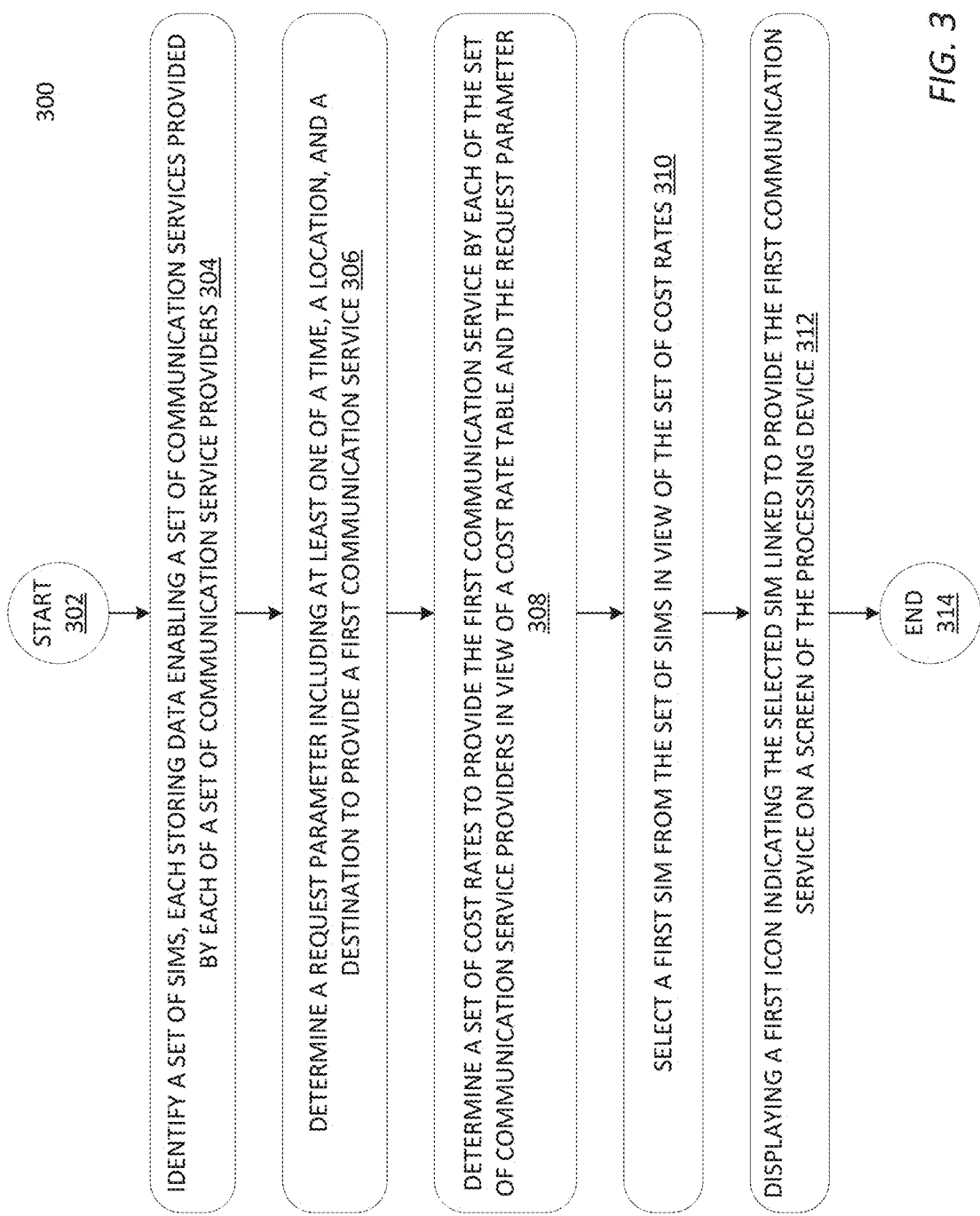
FIG. 3 a flow diagram illustrating a method to perform the selection of SIMS according to an implementation of the present disclosure.

FIG. 3 is a flow diagram illustrating a method 300 to perform the SIM selection according to implementations of the disclosure. The method 300 may be performed by processing logic that comprises hardware (e.g., circuitry, dedicated logic, programmable logic, microcode, etc.), software (e.g., instructions run on a processing device to perform hardware simulation), or a combination thereof.

For simplicity of explanation, methods are depicted and described as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media. In one implementation, the method may be performed by the processing device 102 executing the routing application 122 as shown in FIG. 1A.

Referring to FIG. 3, at 302, the processing logic may start the selection of a SIM card in a multi-SIM mobile communication device. The mobile communication device may be a mobile phone coupled with a more than one SIMs that each may be used to enable communication services with a respective communication service provider. For example, the SIMs may enable the mobile phone to connect to network operators at different countries for call, data, and SMS message services at variable cost rates. A cost rate table that includes the cost rates associated with using these communication services at different time and locations and to different destinations may be stored in a data store of the processing device.

At 304, the processing logic may identify a set of SIMs coupled to the processing device. Each of the SIMs may store data (such as IMSI and/or encryption keys) to enable the processing device to connect to a communication network to receive a set of communication services provided by a communication service provider. Thus, the multiple SIMs coupled to the mobile communication device may enable communication services provided by multiple communication service providers.

At 306, the processing logic may determine a set of parameters relating to the cost rates to provide a first communication service provided by communication service providers. The set of parameters may include at least one of a time, an origination location, or a destination (or termination point) to provide the communication services by the communication service providers. The time may be specific time of the day (e.g., hours) or whether the communication service occurs during peak hours or off-peak hours. The time may be determined using an internal clock of the mobile communication device or an external clock accessible by the mobile communication device. The origination and destination locations may be divided according to countries. The origination and destination locations may be determined using a GPS service accessible by the mobile communication device.

At 308, the processing logic may determine a set of cost rates to provide the first communication service by each of the set of communication service providers in view of the cost rate table and the set of parameters. The cost rates may include the unit prices to provide communication services, such as, for example, the costs to provide a call per minute, data per megabyte, and per SMS message. Different communication service providers may have different cost rates for different communication services according to the set of parameters.

At 310, the processing logic may select a first SIM from the set of SIMs in view of the determined set of cost rates. For example, the cost rates may reflect the expected actual cost for the service. In one implementation, the first SIM is selected because it enables the least expensive communication service provider.

At 312, the processing logic may display an icon on a screen (such as touch screen display of FIG. 1) of the mobile communication device. The icon may include a symbol (or identifier) for the type of communication service and a symbol (or identifier) for the selected SIM. The visual icon may inform a user of the mobile communication device which SIM is selected for the first communication service.

Figure 4:
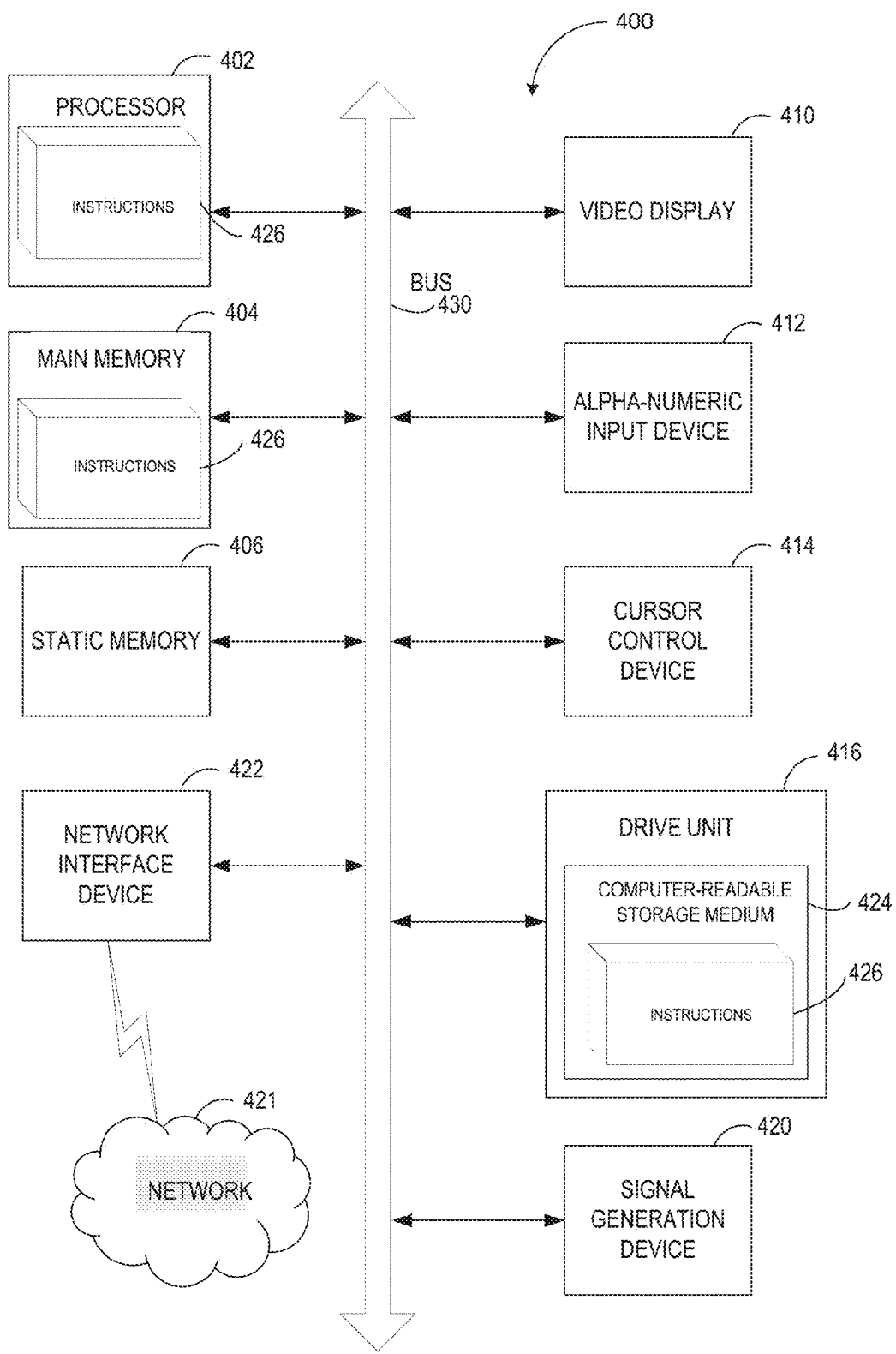
FIG. 4 is a block diagram illustrating an exemplary computer system according to an implementation of the present disclosure.

FIG. 4 illustrates a diagrammatic representation of a machine in the exemplary form of a computer system 400 within which a set of instructions for causing the machine to perform any one or more of the methodologies discussed herein may be executed. In alternative implementations, the machine may be connected (e.g., networked) to other machines in a LAN, an intranet, an extranet, or the Internet. The machine may operate in the capacity of a server or a client machine in a client-server network environment, or as a peer machine in a peer-to-peer (or distributed) network environment. The machine may be a personal computer (PC), a tablet PC, a set-top box (STB), a Personal Digital Assistant (PDA), a cellular telephone, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The exemplary computer system 400 includes a processing device (processor) 402, a main memory 404 (e.g., read-only memory (ROM), flash memory, dynamic random access memory (DRAM) such as synchronous DRAM (SDRAM) or Rambus DRAM (RDRAM), etc.), a static memory 406 (e.g., flash memory, static random access memory (SRAM), etc.), and a data storage device 418, which communicate with each other via a bus 408.

Processor 402 represents one or more general-purpose processing devices such as a microprocessor, central processing unit, or the like. More particularly, the processor 402 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 402 may also be one or more special-purpose processing devices such as an application specific integrated circuit (ASIC), a field programmable gate array (FPGA), a digital signal processor (DSP), network processor, or the like. The processor 402 is configured to execute instructions 426 for performing the operations and steps discussed herein.

The computer system 400 may further include a network interface device 422. The computer system 400 also may include a video display unit 410 (e.g., a liquid crystal display (LCD), a cathode ray tube (CRT), or a touch screen), an alphanumeric input device 412 (e.g., a keyboard), a cursor control device 414 (e.g., a mouse), and a signal generation device 420 (e.g., a speaker).

The data storage device 418 may include a computer-readable storage medium 424 on which is stored one or more sets of instructions 426 (e.g., software) embodying any one or more of the methodologies or functions described herein (e.g., instructions of the routing application 122). The instructions 426 may also reside, completely or at least partially, within the main memory 404 and/or within the processor 402 during execution thereof by the computer system 400, the main memory 404 and the processor 402 also constituting computer-readable storage media. The instructions 426 may further be transmitted or received over a network 474 via the network interface device 422.

While the computer-readable storage medium 424 is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "determining", "enabling", "identifying," "selecting," "displaying," or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

The disclosure also relates to an apparatus for performing the operations herein. This apparatus may be specially constructed for the required purposes, or it may include a general purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

The words "example" or "exemplary" are used herein to mean serving as an example, instance, or illustration. Any aspect or design described herein as "example' or "exemplary" is not necessarily to be construed as preferred or advantageous over other aspects or designs. Rather, use of the words "example" or "exemplary" is intended to present concepts in a concrete fashion. As used in this application, the term "or" is intended to mean an inclusive "or" rather than an exclusive "or". That is, unless specified otherwise, or clear from context, "X includes A or B" is intended to mean any of the natural inclusive permutations. That is, if X includes A; X includes B; or X includes both A and B, then "X includes A or B" is satisfied under any of the foregoing instances. In addition, the articles "a" and "an" as used in this application and the appended claims should generally be construed to mean "one or more" unless specified otherwise or clear from context to be directed to a singular form. Moreover, use of the term "an embodiment" or "one embodiment" or "an implementation" or "one implementation" throughout is not intended to mean the same embodiment or implementation unless described as such.

Reference throughout this specification to "one embodiment" or "an embodiment" means that a particular feature, structure, or characteristic described in connection with the embodiment is included in at least one embodiment. Thus, the appearances of the phrase "in one embodiment" or "in an embodiment" in various places throughout this specification are not necessarily all referring to the same embodiment. In addition, the term "or" is intended to mean an inclusive "or" rather than an exclusive "or."

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A method comprising:
   identifying, by a processing device, a plurality of subscriber identity modules (SIMs) coupled to the processing device, each of the plurality of SIMs storing data enabling a set of communication services provided by a respective one of a plurality of communication service providers;
   determining a location of the processing device;
   determining, by the processing device, a plurality of cost rates to provide the set of communication services by the plurality of communication service providers in view of a cost rate table, wherein the plurality of cost rates are associated with providing the set of communication services from the location of the processing device;
   selecting, in view of the plurality of cost rates, a first SIM to provide a first communication service;
   selecting, in view of the plurality of costs rates, a second SIM to provide a second communication service, wherein the second communication service is a different from the first communication service; and
   displaying, on a screen of the processing device, a first icon associated with the first SIM to provide the first communication service and a second icon associated with the second SIM to provide the second communication service.

2. The method of claim 1, further comprising:
   responsive to receiving activation of the first icon, providing the first communication service via a first communication service provider enabled by the data stored in the first SIM; and
   responsive to receiving activation of the second icon, providing the second communication service via a second communication service provider enabled by the data stored in the second SIM.

3. The method of claim 1, further comprising:
   in response to receiving a change to a request parameter comprising the location of the processing device, determining a second plurality of cost rates associated with providing at least one of the first communication service or the second communication service by the respective one of the plurality of communication service providers in view of the cost rate table and the changed request parameter.

4. The method of claim 1, further comprising:
   displaying a third icon on the screen indicating a third SIM from the plurality of SIMS; and
   in response to receiving activation of the third icon, providing a third communication service via a third communication service provider enabled by the data stored in the third SIM.

5. The method of claim 1, wherein the processing device is a mobile phone comprising a plurality of receptors to receive the plurality of SIMs.

6. The method of claim 1, wherein the data stored in the respective one of plurality of SIMs comprises an international mobile subscriber identity (IMSI) identifying the each of the plurality of SIMs to a network of the plurality of communication service providers.

7. The method of claim 1, wherein the set of communication services comprise at least one of a call service, a data service, or a short message service (SMS).

8. The method of claim 1, wherein the cost rate table comprises a plurality of entries, and wherein each entry comprises a unit price to provide at least one of the set of communication services by at least one of the plurality of communication service providers.

9. The method of claim 8, wherein the unit price to provide the at least one of the set of communication services changes as a function of the request parameter.

10. The method of claim 1, wherein the cost rate table is stored in a data store operatively coupled to the processing device.

11. A non-transitory machine-readable storage medium storing instructions which, when executed, cause a processing device to:
   identify, by the processing device, a plurality of subscriber identity modules (SIMs) coupled to the processing device, each of the plurality of SIMs storing data enabling a set of communication services provided by a respective one of a plurality of communication service providers;
   determine a location of the processing device;
   determine, by the processing device, a plurality of cost rates to provide the set of communication services by the plurality of communication service providers in view of a cost rate table, wherein the plurality of cost rates are associated with providing the set of communication services from the location of the processing device;

select, in view of the plurality of cost rates, a first SIM to provide a first communication service;

select, in view of the plurality of costs rates, a second SIM to provide a second communication service, wherein the second communication service is a different from the first communication service; and display, on a screen of the processing device, a first icon associated with the first SIM to provide the first communication service and a second icon associated with the second SIM to provide the second communication service a first icon indicating the selected first SIM to provide the first communication service.

12. The machine-readable storage medium of claim 11, wherein the processing device is further to:
responsive to receiving activation of the first icon, provide the first communication service via a first communication service provider enabled by the data stored in the first SIM; and
responsive to receiving activation of the second icon, provide the second communication service via a second communication service provider enabled by the data stored in the second SIM.

13. The machine-readable storage medium of claim 11, wherein the processing device is further to:
in response to receiving a change to a request parameter comprising the location of the processing device, determine a second plurality of cost rates associated with providing at least one of the first communication service or the second communication service by the respective one of the plurality of communication service providers in view of the cost rate table and the changed request parameter.

14. The machine-readable storage medium of claim 11, wherein the processing device is further to:
display a third icon on the screen indicating a third SIM from the plurality of SIMS; and
in response to receiving activation of the third icon, provide a third communication service via a third communication service provider enabled by the data stored in the third SIM.

15. The machine-readable storage medium of claim 11, wherein the data stored in the respective one of plurality of SIMs comprises an international mobile subscriber identity (IMSI) identifying the each of the plurality of SIMs to a network of the plurality of communication service providers.

16. The machined-readable storage medium of claim 11, wherein the set of communication services comprise at least one of a call service, a data service, or a short message service (SMS).

17. The machine-readable storage medium of claim 11, wherein the cost rate table comprises a plurality of entries, and wherein each entry comprises a unit price to provide at least one of the set of communication services by at least one of the plurality of communication service providers, and wherein the unit price to provide the at least one of the set of communication services changes as a function of the request parameter.

18. A system, comprising:
a memory to store a cost rate table; and
a processing device, communicatively coupled to the memory, the processing device to:
identify a plurality of subscriber identity modules (SIMs) coupled to the processing device, each of the plurality of SIMs storing data enabling a set of communication services provided by a respective one of a plurality of communication service providers;
determining a location of the processing device;
determine a plurality of cost rates to provide the set of communication services by the plurality of communication service providers in view of the cost rate table, wherein the plurality of cost rates are associated with providing the set of communication services from the location of the processing device;
select, in view of the plurality of cost rates, a first SIM to provide a first communication service;
select, in view of the plurality of costs rates, a second SIM to provide a second communication service, wherein the second communication service is a different from the first communication service; and
display, on a screen of the processing device, a first icon associated with the first SIM to provide the first communication service and a second icon associated with the second SIM to provide the second communication service.

19. The system of claim 18, wherein the processing device is further to:
responsive to receiving activation of the first icon, provide the first communication service via a first communication service provider enabled by the data stored in the first SIM; and
responsive to receiving activation of the second icon, provide the second communication service via a second communication service provider enabled by the data stored in the second SIM.

20. The system of claim 18, wherein the processing device is further to:
in response to receiving a change to a request parameter comprising the location of the processing device, determine a second plurality of cost rates associated with providing at least one of the first communication service or the second communication service by the respective one of the plurality of communication service providers in view of the cost rate table and the changed request parameter.

\* \* \* \* \*